Jan. 2, 1968   F. L. MESSINGER ET AL   3,361,501
ROLLING BEARINGS
Original Filed June 30, 1964
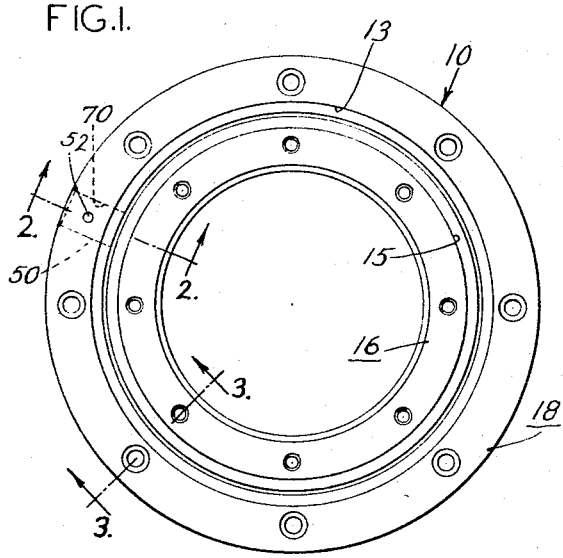
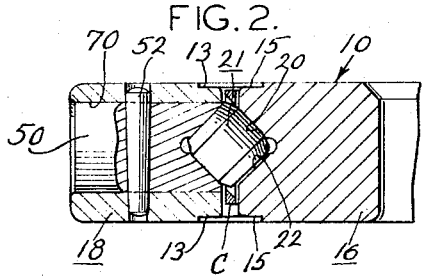
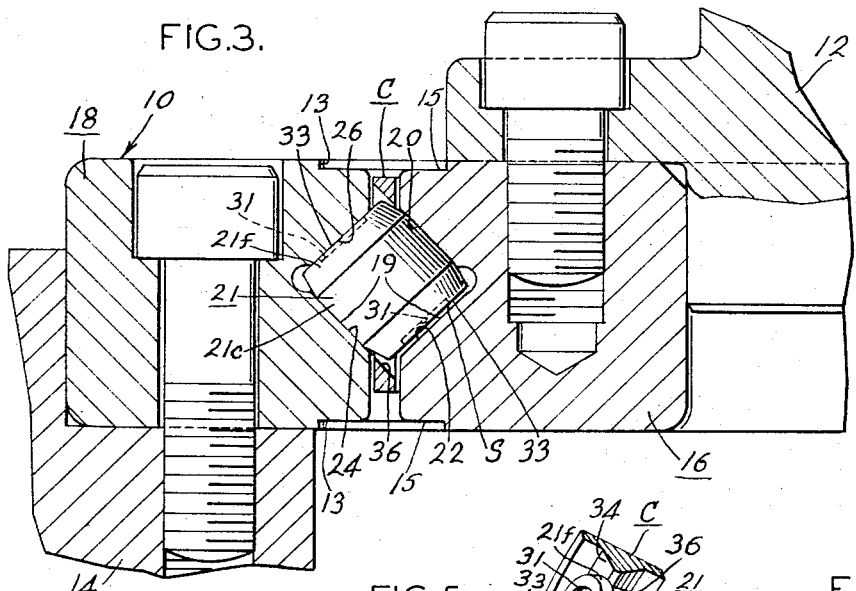
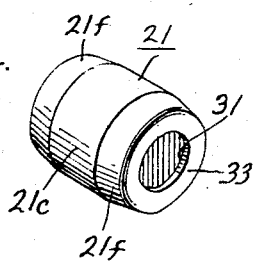
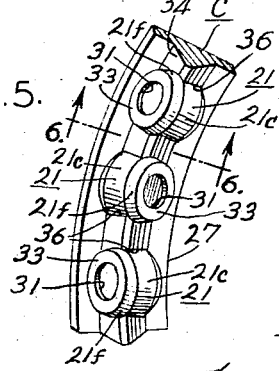
Inventors:
Fred L. Messinger
Warren M. Hatzell
by Howson & Howson Attys.

United States Patent Office 3,361,501
Patented Jan. 2, 1968

3,361,501
ROLLING BEARINGS
Fred L. Messinger, Philadelphia, and Warren M. Hatzell, Abington Township, Montgomery County, Pa., assignors to Messinger Bearings, Inc., Philadelphia, Pa., a corporation of Pennsylvania
Continuation of application Ser. No. 379,236, June 30, 1964. This application Nov. 21, 1966, Ser. No. 607,102
4 Claims. (Cl. 308—219)

This invention relates to improvements in anti-friction bearings and more particularly to improvements in so-called "X-type" bearings.

This is a continuation of my prior application Ser. No. 379,236, filed June 30, 1964, for "Rolling Bearings," now abandoned.

In prior Patent No. 2,607,641 there is shown a typical X-type bearing assembly which includes inner and outer race rings having confronting, angularly disposed raceways defining an annular space therebetween for a plurality of rollers having cylindrical load carrying surfaces and a cage for guiding and circumferentially spacing the rollers in the annular space. One of the race rings is split or two-pieced to facilitate assembly of the cage and rollers. These roller bearing assemblies are typically used in industrial applications wherein they are subjected to radial load and thrust load, or either one of the two.

The X-type bearing of the present invention is characterized by novel features of construction and arrangement providing an assembly which is economical to manufacture, easy to assemble and which provides several functional or operational advantages over previously known X-type bearings. For example, one of the features of the present invention is the provision of rollers wherein the load carrying surface is slightly tapered adjacent the axial end of the roller. By this construction, the roller adjusts or accommodates its contact area with the raceways as required by the magnitude of the load so that the effect of differential relative speeds is greatly reduced, thereby practically eliminating "scrubbing." This roller configuration tends to compensate for mounting inaccuracies or shaft or housing deflections under load. Tapering the ends of the load carrying surface of the rollers also prevents concentration of heavy undesirable stresses at the ends of the rollers as was heretofore the case with cylindrical rollers, whereby the service life expectancy of the bearing assembly is extended considerably.

Another feature of the X-type bearing assembly of the present invention is the provision of rollers with axial end surfaces which are "squared," that is, end faces which are normal to the rotational axis of the roller. With "squared" ends, the bearing operates in a smooth and chatterless manner at heavy loads and very low speeds so that the bearing is extremely suitable for use in heavy duty machinery to provide, for example, a precision mount for a rotating element thereof. The "squared" ends also provide a maximum stabilizing moment on the rolling axis of the roller due to the fact that the roller ends engage the inner and outer rolling element raceway adjoining and paralleling them.

The combined "squared" ends and the tapered end load carrying surfaces result in stabilized or practically constant torque coefficients for the bearing under a variety of load combinations. A further functional advantage of the "squared" ends of the rollers is the fact that the roller rolling axis is maintained contiguous with the axis of rotation of the bearing under conditions of relatively light load and high speed whereby the dynamic life of the bearing is improved and wear is minimized. The axial guidance control provided by the squared ends also in many cases eliminates the need for a roller cage, retainer or separator.

Another feature of an X-type bearing constructed in accordance with the present invention is the provision of an undercut or recess in the center of the opposite axial end faces of the rollers. It has been found that the most effective control area is that part of the squared end face which is at the greatest radius from the rolling center line of the roller. Thus, by providing a centrally disposed recess in the axial end face, only the most effective control area on the squared end of the roller engages the raceway. Additionally, the recess serves as reservoir for lubricant which adds to the service life of the bearing in severe applications.

In accordance with the present invention, the X-type bearing assembly is characterized by a novel arrangement of elements, providing ease of assembly of the elements of the bearing. More specifically, the assembly incorporates a so-called "plug loading feature" comprising, for example, a radial opening in one of the race rings through which the rollers may be inserted into the pockets of the cage. After all the rollers are inserted in the annular space between the race rings, the opening is adapted to be closed with a plug or the like. This loading arrangement not only enables the use of one-piece inner and outer rings which are structurally stronger than heretofore known two-piece races, but also permits inspection of the rollers, cage and at least one of the raceways without major disassembly of the bearing. Further by this arrangement the complete set of rollers can be replaced readily, the opening also providing an access for sampling and evaluating lubricant under service conditions as well as a means for replenishing or adding lubricant to a sealed bearing assembly.

The foregoing and other objectives of the present invention and the various features and details of the construction and operation thereof are hereinafter more fully set forth with reference to the accompanying drawings, wherein:

FIG. 1 is an end view of an X-type bearing assembly embodying the present invention;

FIG. 2 is an enlarged fragmentary sectional view taken on lines 2—2 illustrating the so-called "plug loading";

FIG. 3 is an enlarged fragmentary sectional view taken on lines 3—3 of FIG. 1;

FIG. 4 is a perspective view of a roller for an X-type bearing in accordance with the present invention;

FIG. 5 is a fragmentary perspective view of the cage and rollers; and

FIG. 6 is a sectional view taken on lines 6—6 of FIG. 5.

Referring now to the drawing, and particularly to FIG. 3 thereof, there is illustrated a bearing assembly 10 constructed in accordance with the present invention, which is adapted to be mounted between relatively rotatable members 12 and 14. The bearing assembly 10 comprises one-piece inner and outer rings 16 and 18 respectively, secured, for example by bolts to the relatively rotatable members 12 and 14. The rings 16 and 18 are provided with raceways defining therebetween an annular space 19 for a plurality of roller elements 21 and a cage C. In the present instance the inner ring 16 is provided with right angularly disposed raceways 20 and 22 and the outer ring 18 is also provided with right angularly disposed raceways 24 and 26, the raceways in the inner and outer rings being arrayed so the raceways 20 and 24 are in confronting and parallel relation and the raceways 22 and 26 are in confronting and parallel relation in the assembled bearing to provide an annular space 19 of generally square cross section.

The outer ring 18 has a cirmumferentially extending undercut 13 in each axial end face adjacent to its inner edge, and the inner ring has a circumferentially extending undercut 15 in each axial end face adjacent to its outer peripheral surface. Thus, in the assembled bearing the undercuts provide an annular recess for application of a shield or seal if desired. Further, by providing these undercuts in the rings, the X-type bearing can be bolted down with the required force around the inner and outer rings without disturbing the internal clearances in the bearing.

In the bearing shown, the cage C comprises a plurality of segments 27 for ease of assembly in the annular space 19. In the assembled bearing the segments 27 are in end to end abutting relation to form a continuous cage. One of the segments 27 is illusrtated in FIG. 5 and is formed with a projection 34 which is triangular in cross section and which in the assembled bearing engages in the portion of the annular space defined by the raceways 20 and 22 of the inner ring 16. The outer surface of the cage C is cylindrical as illustrated. A plurality of openings are provided in the cage at circumferentially spaced intervals to define pockets 36 for the rollers. The pockets are suitably oriented so that in the present instance the axes of rotation of adjacent rollers 21 are disposed 90° relative to one another.

The rollers 21 are each generally cylindrically shaped as illustrated, for example in FIG. 4, and are preferably of a greater diameter than their axial length so that a clearance S is afforded between the axial ends of the rollers 21 and the raceways in the right angular relation to the raceways with which the rollers 21 are in rolling engagement. (See FIG. 3.) In the present instance, every other roller rides on surfaces 20 and 24 to take the axial load forces in one direction while the alternate rollers ride on the surfaces 22 and 26 to take the axial load forces in the opposite direction. The rollers 21 thus operate with their axes of rotation inclined in opposite directions so that a single row of rollers accomplishes the function of taking up load forces in both axial directions, a function which otherwise requires two set rows of rollers. Under certain operating conditions, the axial load force in one direction may exceed the axial load force in the opposite direction and in these instances more rollers may be positioned to act to take the axial load in the direction of the greater force than in the direction of the lesser force.

Under these circumstances, the roller pockets 36 may be so oriented that more rollers can be positioned to take the axial load force in the direction of the greater force than in the direction of the lesser force.

In accordance with the present invention, the rolling bearing is characterized by novel features of construction and arrangement providing a better functioning bearing under a variety of operating conditions and one characterized by greater durability. To this end, each of the rollers 21 has its outer peripheral load carrying surface slightly tapered adjacent to the axial ends thereof, the taper preferably being in the range of 1° or less. In the present instance, as best illustrated in FIG. 4, each roller 21 has a generally cylindrical central section $21_c$ and frusto conical sections $21_f$ at opposite ends of the central section, each frusto conical section $21_f$ converging toward its respective axial end face of the roller. By this arrangement the roller 21 adjusts or accommodates its contact area with the confronting raceways with which it engages as is required by the magnitude of the load. For example, a relatively light load applied to the roller produces less rolling contact area than a relatively heavy load while maintaining approximately equal unit loadings and contact stresses in the rollers. Thus, the undesirable effects of "scrubbing" caused by differential relative speeds are practically eliminated.

In rolling bearings where the rollers are cylindrical, all points on the cylindrical load carrying surface of the roller rotate about the rotational axis thereof at the same angular velocity. Since the complete bearing rotates on an axis 45° removed from an axis parallel to the rolling axis of the rollers, the velocities occurring along the length of the cylindrical rollers and raceways were not theoretically correct. This resulted in some sliding or "scrubbing" of the roller which occurred near the ends of the rolling contact surface of the cylindrical roller. This condition is greatly reduced by tapering the load carrying surface of the rollers adjacent their axial ends.

Tapering the ends of the load carrying surface of the rollers also prevents the concentration of heavy, undesirable stresses at the ends of the rollers, and the accompanying high stresses induced in the raceways. The service life expectancy is increased over that of a similar bearing employing straight cylindrical rollers. Further, the roller configuration of the present invention also enables the bearing to more readily function with geometric inaccuracies in other components of the bearing assembly such as the mounting, or under conditions where lightweight, non-rigid support of the bearing is used.

Another feature or characteristic of the rolling bearing assembly of the present invention providing a more effective X-type bearing is the provision of rollers having "squared" end surfaces which in the illustrated bearing are provided with a generally circular recess 31 therein. In the present instance, the recess 31 in each axial end face is circular to define annular, ring-like contact areas 33 which extend normal to the rotational axis of the roller.

Under certain operating conditions, for example, when the bearing is subjected to an eccentric thrust load, the rolling elements are subjected to gyratory forces. However, with the roller bearing configuration of the present invention, there is provided a maximum stabilizing moment on the rolling axis of the roller, this stabilizing moment being developed by the squared ends or more specifically the annular contact areas 33 of the rollers engaging the inner and outer raceways which confront the contact areas 33. Further the combined features of the squared ends and recesses in the axial ends of the rollers result in stabilized or practically constant torque coefficients for the bearing assembly under a variety of combinations of loadings so that the bearings may be used effectively in applications where radial, thrust and overturning moment loading are experienced simultaneously. Additionally the squared axial ends serve to align or guide the rolling elements and maintain the rolling axis of the rollers contiguous with the axis of rotation of the bearing particularly under conditions of relatively light load and high speed. This greatly improves the dynamic life of the rolling bearing assembly and minimizes wear under high rotational speeds.

The undercuts or recesses in the axial ends of the rollers serve to prolong the wear life of the rollers by reason of the fact that only the most effective area of the roller engages the race surface adjacent it, the most effective control area on the squared end face of the roller being that part thereof which is at the greatest radius from the axis of rotation of the roller.

In accordance with the present invention, the X-type bearing assembly is characterized by a novel arrangement of elements providing ease of assembly of the bearing assembly. To this end one of the rings, in the present instance, the outer ring is provided with a radial opening 70 to facilitate assembly of the rollers in the annular space between the rings. Thus, as illustrated in the drawings, in assembling the bearing the cage segments may be inserted between the inner and outer rings and the rollers 21 may be inserted one at a time through the opening 70, the cage segments being rotated circumferentially after insertion of each roller to align each of the cage pockets with the opening. After all of the rollers have been assembled, a plug 50 is inserted into the opening 70 which is retained in place therein by means of a tapered pin 52 engaging through aligned openings in the ring and plug.

Thus, one-piece inner and outer rings may be used which, of course, are structurally stronger than the two-piece rings of many prior bearing assemblies. Further by this arrangement, the rollers may be easily removed for periodic inspection without major disassembly of the rolling bearing. Of course, this also facilitates replacement of an entire set of rollers without disassembly. Additionally the particular arrangement facilitates evaluation and sampling of lubricant under actual service conditions and the replenishment or addition of lubricant again without major disassembly of the rolling bearing assembly.

From the foregoing it is readily apparent that the rolling bearing of the present invention has many functional advantages, for example, high load capacity, excellent stiffness for load deflection per unit loading, long operating life and high shock capacity and a practically constant torque coefficient under varying and simultaneous radial, thrust and overturning moment loads.

Even though the present invention has been illustrated and described in connection with an X-type bearing having one-piece inner and outer rings, it is to be understood that various of the features of the present invention, for example, the roller configuration, are applicable to other types of bearing assemblies and other types of X bearing assemblies.

While a particular embodiment of the present invention has been illustrated and described herein, it is of course to be understood that changes and modifications may be made herein within the scope of the following claims.

We claim:

1. An X-type bearing assembly comprising inner and outer rings, each of said rings having a pair of circumferentially extending raceways which are disposed at right angular relation to one another and which are arrayed so that one of the raceways of the inner ring confronts and is parallel to one of the raceways of the outer ring and the other raceway of the inner ring confronts and is parallel to the other raceway of said outer ring, a plurality of rollers in the annular space defined by the raceways, each of said rollers having a load carrying surface between its axial end faces engaging the raceways comprising a central cylindrical portion and frusto-conical portions at opposite ends of said cylindrical portion, whereby the rollers adjust their contact area with the raceways as required by the magnitude of the load, each frusto-conical portion converging from said cylindrical portion toward the axial end face of the roller, the cylindrical portion of each of said rollers being of a greater diameter than the distance between the axial end faces of the rollers, a cage having pockets in the annular spaced for circumferentially spacing the rollers, said cage comprising a plurality of arcuate segments which in the assembled relation provide a continuous circumferentially extending structure, means defining at least one opening in at least one of said rings of a size and shape to permit insertion of said rollers therethrough into said annular space, a plug for closing said opening in said ring when all of the rollers have been inserted, some of the rollers in the annular space having their load carrying surface engaging said one raceway of the inner and outer rings and the remainder of the rollers having their load carrying surface engaging the other raceway of the inner and outer rings whereby the axes of rotation of some of the rollers are inclined in a direction opposite to that of the other roller so that the bearing is adapted to withstand axial load forces in either axial direction, radial load from any direction and overturning moment load from any direction, these loads being applied singularly or in any combination.

2. An X-type bearing assembly comprising inner and outer rings, each of said rings having a pair of circumferentially extending raceways which are disposed at right angular relation to one another and which are arrayed so that one of the raceways of the inner ring confronts and is parallel to one of the raceways of the outer ring and the other raceway of the inner ring confronts and is parallel to the other raceway of said outer ring, a plurality of rollers in the annular space defined by the raceways, each of said rollers having a load carrying surface between its axial end faces engaging the raceways comprising a central cylindrical portion and frusto-conical portions at opposite ends of said cylindrical portion, whereby the rollers adjust their contact area with the raceways as required by the magnitude of the load, each frusto-conical portion converging from said cylindrical portion toward the axial end face of the roller, the cylindrical portion of each of said rollers being of a greater diameter than the distance between the axial end faces of the rollers, means defining a recess in the axial end faces of each of the rollers, a cage having pockets in the annular space for circumferentially spacing the rollers, said cage comprising a plurality of arcuate segments which in the assembled relation provide a continuous circumferentially extending structure, means defining at least one opening in at least one of said rings of a size and shape to permit insertion of said rollers therethrough into said annular space, a plug for closing said opening in said ring when all of the rollers have been inserted, some of the rollers in the annular space having their load carrying surface engaging said one raceway of the inner and outer rings and the remainder of the rollers having their load carrying surface engaging the other raceway of the inner and outer rings whereby the axes of rotation of some of the rollers are inclined in a direction opposite to that of the other roller so that the bearing is adapted to withstand axial load forces in either axial direction, radial load from any direction and overturning moment load from any direction, these loads being applied singularly or in any combination.

3. A bearing assembly as claimed in claim 2, wherein the recess in the axial end face of each roller is circular and disposed centrally of the axial end face thereby to define ring-like contact areas which extend normal to the rotational axis of the roller.

4. A bearing assembly as claimed in claim 2 wherein the frusto-conical converging portion of each roller is on greater than 1°.

References Cited

UNITED STATES PATENTS

| 1,896,978 | 2/1933 | Hele-Shaw et al. | 308—198 |
| 2,430,359 | 11/1947 | Messinger | 308—234 |
| 2,759,243 | 8/1956 | Smith | 308—198 |
| 2,926,939 | 3/1960 | Workman | 308—187.2 |

FOREIGN PATENTS

| 973,265 | 9/1950 | France. |
| 1,226,229 | 2/1960 | France. |
| 225,415 | 5/1943 | Switzerland. |

MARTIN P. SCHWADRON, *Primary Examiner.*

FRANK SUSKO, *Examiner.*